(12) United States Patent
Yamazaki (10) Patent No.: US 7,058,258 B2
(45) Date of Patent: Jun. 6, 2006

(54) TUNABLE DISPERSION COMPENSATOR AND METHOD FOR TUNABLE DISPERSION COMPENSATION

(75) Inventor: Hiroyuki Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 10 days.

(21) Appl. No.: 10/889,179

(22) Filed: Jul. 13, 2004

(65) Prior Publication Data
US 2005/0013537 A1    Jan. 20, 2005

(30) Foreign Application Priority Data
Jul. 14, 2003    (JP)    ............................. 2003-274021

(51) Int. Cl.
*G02B 6/26*    (2006.01)
*G02B 6/42*    (2006.01)

(52) U.S. Cl. .......................................... 385/27; 385/39

(58) Field of Classification Search ................... 385/27, 385/39
See application file for complete search history.

(56) References Cited

U.S. PATENT DOCUMENTS 6,766,083 B1 * 7/2004 Bona et al. .................... 385/40

2002/0186920 A1 * 12/2002 Viens et al. ................... 385/27
2003/0231826 A1 * 12/2003 Boyd et al. .................... 385/27

FOREIGN PATENT DOCUMENTS

JP    H06-224860 A    8/1994
JP    2000-151513 A    5/2000

* cited by examiner

*Primary Examiner*—Sung Pak
*Assistant Examiner*—Tina M Wong
(74) *Attorney, Agent, or Firm*—Sughrue Mion, PLLC (57) ABSTRACT

A tunable dispersion compensator and a tunable dispersion compensation method having a simple structure which can be easily controlled are provided. A tunable dispersion compensator 201 is constructed of first to nth ring resonators $202_1$ to $202_n$ having the same delay time spectrum arranged in series. These resonators are provided with first to nth ring-shaped waveguides $204_1$ to $204_n$ for a common linear waveguide 203 through directional couplers $206_1$ to $206_n$. Heaters $205_1$ to $205_n$ are disposed in the first to nth ring-shaped waveguides $204_1$ to $204_n$. By controlling temperatures of these heaters, central wavelengths of the respective ring resonators $202_1$ to $202_n$ are controlled and the dispersion of an optical signal input to the waveguide 203 is compensated.

35 Claims, 11 Drawing Sheets

TUNABLE DISPERSION COMPENSATOR AND METHOD FOR TUNABLE DISPERSION COMPENSATION

BACKGROUND OF THE INVENTION

1. Field of the Invention

The present invention relates to a tunable dispersion compensator and a method for tunable dispersion compensation for compensating dispersion of an optical signal.

2. Description of Related Art

With the growing demand for information communication, there is a demand for greater transmission capacities. To meet this demand, efforts are being made to increase a transmission rate in an optical communication system. As the transmission rate is increased, a light waveform deteriorates due to chromatic dispersion in an optical fiber. The chromatic dispersion refers to a phenomenon that the rate at which an optical signal propagates through the optical fiber varies depending on the wavelength. Thus, a dispersion compensating fiber (DCF) is widely used to suppress the deterioration of the light waveform due to chromatic dispersion.

The DCF is designed to have a core diameter smaller than that of an ordinary optical fiber. This makes chromatic dispersion negative. This causes the chromatic dispersion of the DCF to have a characteristic having directionality opposite to that of the ordinary optical fiber. Therefore, combining the ordinary optical fiber with this DCF makes it possible to cancel chromatic dispersion produced by the ordinary optical fiber with the DCF and to suppress the deterioration of the light waveform.

However, the DCF does not have so great an amount of negative dispersion per length. Thus, the length of the DCF required to obtain an amount of dispersion compensation capable of long-distance communication is several tens of km. This causes a problem that the size of the equipment carrying out compensation of chromatic dispersion increases. Furthermore, since the DCF has quite a large transmission loss of an optical signal, an expensive light amplifier is required to compensate for the transmission loss. Furthermore, since the DCF has a small core diameter, the optical signal is trapped in a narrow area. This causes nonlinear interaction, deteriorating the light waveform. There is another problem that the amount of chromatic dispersion cannot be made variable. Thus, the use of the DCF involves many problems. Therefore, there is a demand for realization of a tunable dispersion compensator, which solves these problems.

A first proposal for this is a tunable dispersion compensator using a ring resonator formed of a PLC (planar lightwave circuit) (see Japanese Patent Application Laid-Open No. 06-224860, for example). Here, the PLC refers to a silica glass optical waveguide formed by depositing silica glass, etc., on a silicon or silica substrate. The PLC also includes an optical component or optical circuit with an optical fiber array connected to the silica glass optical waveguide. This first proposal is constructed of a one-stage ring resonator placed between optical fibers or between an optical fiber and optical multiplexed receiving apparatus, wherein an optical multiplexed signal is output with a time delay. This first proposal is an attempt to compensate for all wavelengths to be used at once for chromatic dispersion which the optical multiplexed signal receives inside the optical fiber.

However, since this first proposal uses only one stage of the ring resonator, the problem is that the range of wavelengths, dispersion of which can be compensated, is narrow. This involves another problem that when the wavelength of the optical signal used thereby increases and if the wavelength band used is broadened, chromatic dispersion cannot be compensated.

Figure 1:
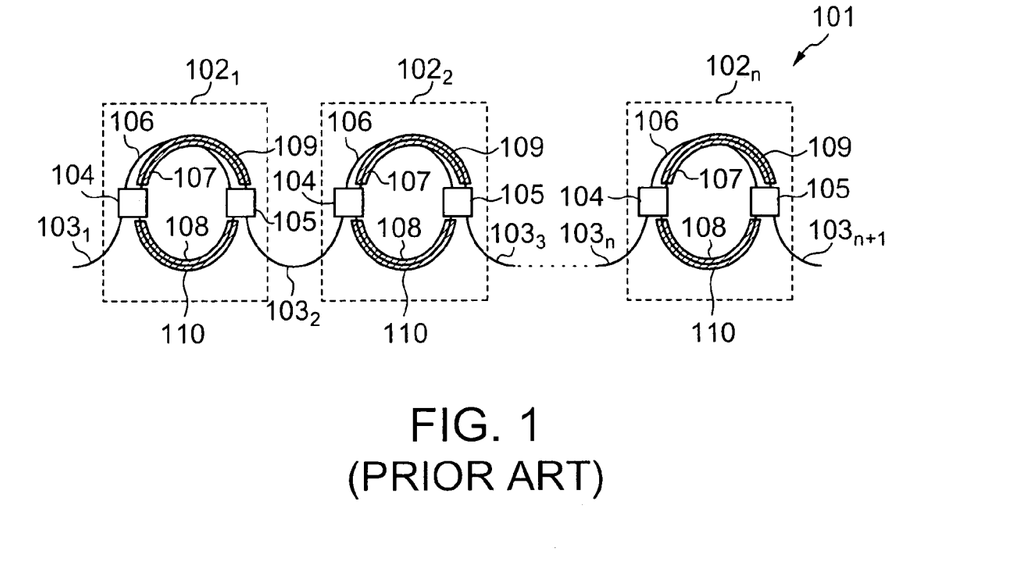
FIG. 1 is a schematic block diagram showing a tunable dispersion compensator according to a conventional second proposal.

Thus, a second proposal is a structure using a plurality of ring resonators. FIG. 1 shows a tunable dispersion compensator with a plurality of ring resonators connected in series. This tunable dispersion compensator 101 is constructed of a first to nth ring resonators $102_1$, $102_2$, ..., $102_n$, a waveguide $103_1$ which inputs an optical signal to the first ring resonators $102_1$, waveguides $103_2$, ..., $103_n$ which connect the first to nth ring resonators $102_1$, $102_2$, ..., $102_n$ in series and a waveguide $103_{n+1}$ which outputs an optical signal from the nth ring resonator $102_n$. The first to nth ring resonators $102_1$, $102_2$, ..., $102_n$ have the same structure. Therefore, the first ring resonator $102_1$ will be explained as a representative.

The first ring resonator $102_1$ is provided with a first coupler 104 having two inputs and two outputs connected to one end of the waveguide $103_1$ and a second coupler 105 also having two inputs and two outputs connected to one end of the waveguide $103_2$. First and second arms 106, 107 in a semicircular shape are connected to the output side of the first coupler 104 and input side of the second coupler 105 crossing each other midway, constituting a Mach-Zender interferometer. Furthermore, one end of the waveguide $103_1$ and one end of a semicircular third arm 108 are connected to the input side of the first coupler 104. Furthermore, the other end of the third arm 108 and one end of the waveguide $103_2$ are connected to the output side of the second coupler 105. The second arm 107 and the third arm 108 are provided with first and second heaters 109, 110, respectively.

This first ring resonator $102_1$ performs tunable dispersion compensation by controlling the first and second heaters 109, 110. That is, this ring resonator controls a delay time difference in the first and second arms 106, 107 by controlling the temperature of the first heater 109 disposed on only one arm making up the Mach-Zender interferometer. Furthermore, this ring resonator controls a resonating central wavelength by controlling the temperature of the second heater 110.

In order for this type of tunable dispersion compensator to perform dispersion compensation, the number of stages n of the ring resonators required is generally "4" or so. A case where the number of stages n is "4" will be considered by way of example. The first to fourth ring resonators $102_1$ to $102_4$ can set their respective amounts of dispersion to different values by controlling power to be applied to their respective first heaters 109. Furthermore, these ring resonators $102_1$ to $102_4$ can set their respective resonating central wavelengths to different values by controlling power to be applied to their respective second heaters 110 likewise.

Figure 2:
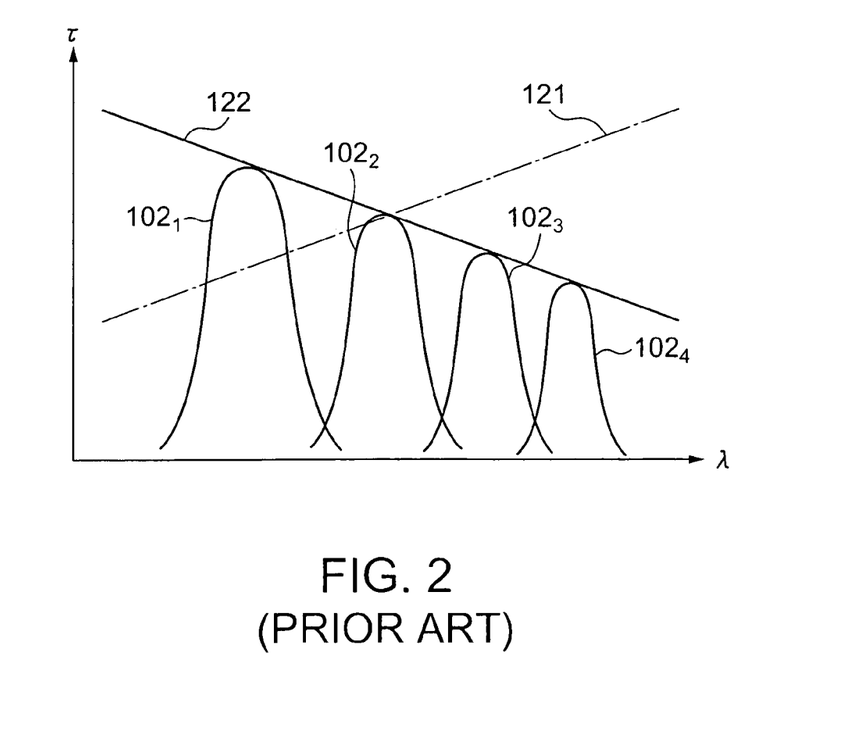
FIG. 2 illustrates a principle of dispersion compensation by the tunable dispersion compensator shown in FIG. 1.

FIG. 2 shows a principle of dispersion compensation at the tunable dispersion compensator 101 with the serial connection shown in FIG. 1. In FIG. 2, the vertical axis represents a delay time τ of an optical signal and the horizontal axis represents a wavelength λ. A chromatic dispersion characteristic 121 of the optical fiber represented by a two-dot dashed line indicates a general chromatic dispersion characteristic of an optical fiber. Compensating for this chromatic dispersion characteristic requires a chromatic dispersion characteristic 122 inclined in a direction opposite to the chromatic dispersion characteristic 121 to be given. Therefore, as shown in FIG. 2, the chromatic dispersion characteristic 122 is formed by combining chromatic dispersion characteristics of the respective ring resonators $102_1$ to $102_4$. Thus, combining the chromatic dispersion characteristic 122 of reverse inclination with the chromatic dispersion characteristic 121 cancels out the chromatic dispersion of the optical signal.

However, the tunable dispersion compensator 101 of the second proposal shown in FIG. 1 requires heaters 109, 110 twice as many for each of the ring resonators $102_1$ to $102_n$. Therefore, the number of parts increases and the amount of power required also increases. Furthermore, the power applied to these parts must be controlled individually with precision. This requires special control by an information processing apparatus such as a DSP (digital signal processor) or personal computer. Furthermore, acquiring a desired amount of chromatic dispersion requires an amount of power of each heater to be determined experimentally. This setting requires a long time and reduces productivity of the tunable dispersion compensator 101.

Figure 3:
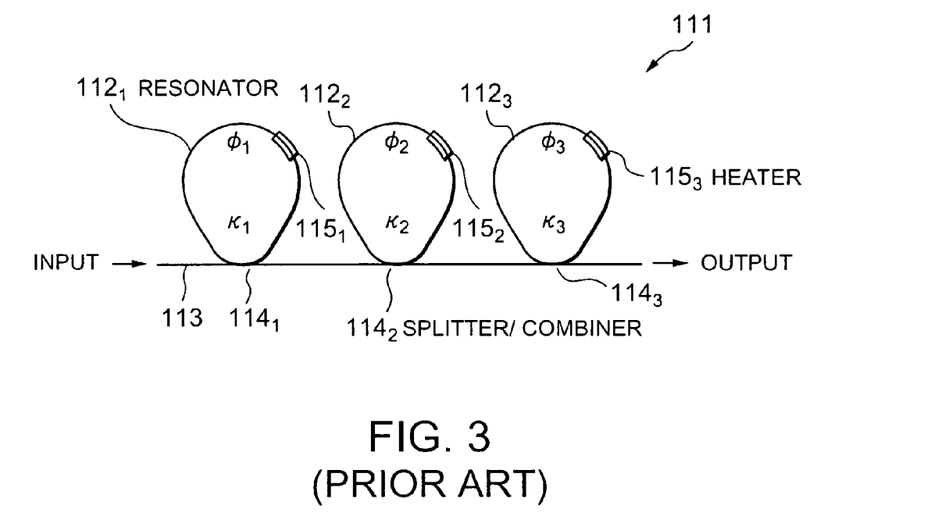
FIG. 3 is a schematic block diagram showing a tunable dispersion compensator according to a conventional third proposal.

Therefore, as a third proposal, an attempt to reduce the number of heaters is shown in FIG. 3 (see Japanese Patent Application Laid-Open No. 2000-151513, for example). The second proposal shown in FIG. 1 disposes the first heater 109 and thereby controls delay times of the respective ring resonators $102_1$ to $102_n$ to different delay times as shown in FIG. 2. Instead of this, the tunable dispersion compensator 111 of this third proposal sets coupling efficiencies $\kappa_1$ to $\kappa_3$ of the respective ring resonators $112_1$ to $112_3$ to different values and thereby sets phases $\phi_1$ to $\phi_3$ of the respective ring resonators $112_1$ to $112_3$ to different values. In this way, the delay times of the respective ring resonators $112_1$ to $112_3$ are changed as shown in FIG. 2. Each of the ring resonators $112_1$ to $112_3$ is provided with one of the heaters $115_1$ to $115_3$ for controlling a resonating central wavelength.

Here, with the tunable dispersion compensator 111 according to the third proposal shown in FIG. 3, the number of heaters is reduced compared to the second proposal. However, since the design differs from one ring resonator to another, the problem is that these ring resonators differ in the design, manufacture, control and inspection, which makes the structure of the tunable dispersion compensator 111 more complicated.

In these conventional proposals, delay time spectra of the respective ring resonators are basically spaced uniformly as shown in FIG. 2 to obtain a slope with a desired dispersion characteristic.

SUMMARY OF THE INVENTION

It is an object of the present invention to provide a tunable dispersion compensator and a tunable dispersion compensation method carrying out chromatic dispersion compensation in a simple structure.

The tunable dispersion compensator according to the present invention comprises a plurality of resonators connected in series having the same delay time spectrum and central wavelength controlling means for controlling the resonating central wavelengths of the respective resonators. The respective resonating central wavelengths are controlled to respective predetermined values by the central wavelength controlling means and the respective delay time spectra of the resonators are combined. This makes it possible to control the inclination of the slope of the combined delay time spectrum and to change the amount of dispersion compensation by the degree of the inclination of the slope.

Thus, in the tunable dispersion compensator of the present invention, the plurality of resonators have the same time delay spectrum. By controlling central wavelengths for the delay time spectra of the same shape acquired in this way, the inclination of the slope of the combined delay time spectrum (hereinafter referred to as "combined waveform") is controlled.

Thus, the tunable dispersion compensator of the present invention is characterized by controlling resonating central wavelengths for a plurality of time delay spectra of the same shape, thereby producing various combinations of central wavelengths and obtaining a desired combined waveform. Chromatic dispersion is compensated by approximating this combined waveform to a waveform of the optical fiber whose chromatic dispersion is compensated.

Furthermore, the resonator can also be a ring resonator. The ring resonator is preferably provided with a linear waveguide, a plurality of ring-shaped waveguides arranged along the linear waveguide and an optical coupler that optically couples the linear waveguide and the ring-shaped waveguides. Furthermore, the respective ring-shaped waveguides preferably have the same shape and size and the respective optical couplers preferably have the same coupling efficiency. This allows the resonator to be formed in a simpler structure.

Furthermore, the optical couplers may also be a directional coupler or multi-mode interference (MMI). This allows the optical couplers to be formed in a simpler configuration.

Furthermore, the respective central wavelengths may also be distributed densely to coarsely on the wavelength axis. Moreover, the respective central wavelengths may also be distributed exponentially densely to coarsely on the wavelength axis or may also be distributed densely to coarsely as a function of nth degree (n: integer of 2 or greater). This allows a more gently sloping dispersion characteristic to be obtained.

Furthermore, the linear waveguide, ring-shaped waveguides and optical couplers provided for the ring resonator may also be formed of silica glass optical waveguides. In that case, the central wavelength controlling means may also be temperature controlling means. Furthermore, the temperature controlling means preferably covers the whole area of the ring-shaped waveguide except the part constituting the optical coupler. This makes it easier to manufacture the ring resonator. Furthermore, the temperature controlling means covering the whole area of the ring-shaped waveguide can reduce power consumption and make the temperature of the ring-shaped waveguide more uniform.

Furthermore, the linear waveguide, ring-shaped waveguides and optical couplers may also be formed of ferroelectric optical waveguides. In that case, the central wavelength controlling means may also be electric field application controlling means. This allows the ring resonator to be manufactured more simply.

Furthermore, the plurality of resonators are preferably structured in at least three or more stages. This makes it easier to obtain a desired dispersion characteristic.

BRIEF DESCRIPTION OF THE DRAWINGS

The above and other objects, features and advantages of the present invention will become more apparent from the following detailed description when taken in conjunction with the accompanying drawing wherein.

DETAILED DESCRIPTION OF THE PREFERRED EMBODIMENTS

The basic structure and operating principle of a tunable dispersion compensator and a tunable dispersion compensation method according to the present invention will be explained below.

The basic structure of a tunable dispersion compensator according to a first embodiment of the present invention will be explained.

Figure 4:
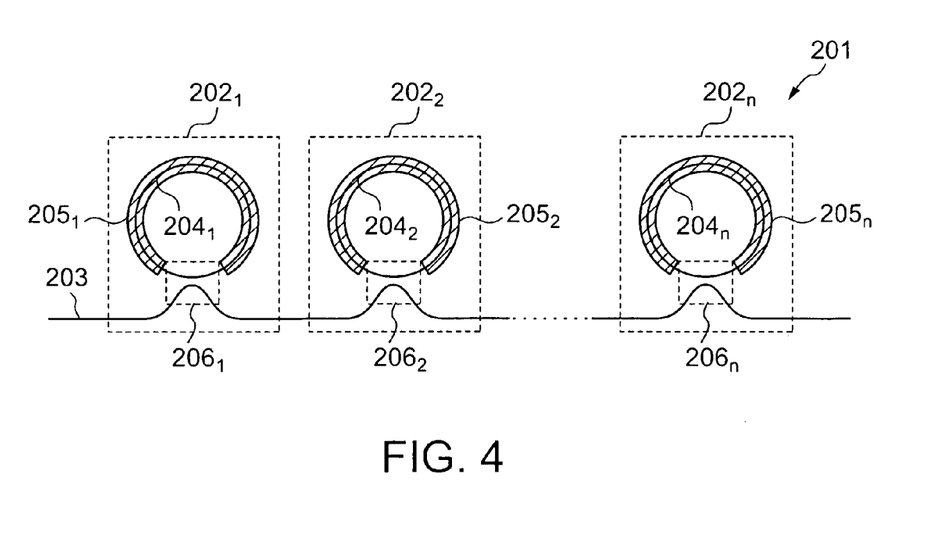
FIG. 4 is a schematic block diagram showing a tunable dispersion compensator according to a first embodiment of the present invention.

FIG. 4 shows a schematic structure of the tunable dispersion compensator according to the first embodiment of the present invention. This tunable dispersion compensator 201 is constructed of first to nth ring resonators $202_1$, $202_2$, ..., $202_n$ connected in series. The first to nth ring resonators $202_1$, $202_2$, ..., $202_n$ are provided with one common linear waveguide 203. A chromatically dispersed optical signal is input from an optical fiber (not shown) to the left end of this linear waveguide 203. The first to nth ring resonators $202_1$, $202_2$, ..., $202_n$ have basically the same structure. Here, the first ring resonator $202_1$ will be explained as a representative.

The first ring resonator $202_1$ is provided with a ring-shaped waveguide $204_1$ and a heater $205_1$ to heat this. The portion of the linear waveguide 203 facing the ring-shaped waveguide $204_1$ is close thereto. The portion close thereto constitutes a directional coupler $206_1$. The first to nth ring-shaped waveguides $204_1$ to $204_n$ have basically the same shape and the same size. Furthermore, the coupling efficiency of the directional coupler is basically the same. Therefore, the first to nth ring resonators $202_1$ to $202_n$ have basically the same phase and basically the same delay time. The heater $205_1$ is disposed on the ring-shaped waveguide $204_1$. When power is supplied, the heater $205_1$ controls the temperature of the ring-shaped waveguides $204_1$. In this way, the central wavelength of the delay time spectrum of the first ring resonator $202_1$ is controlled to a desired value. The heater $205_1$ preferably covers the whole area of the ring-shaped waveguide $204_1$ except the portion constituting the directional coupler $206_1$ as shown in FIG. 4. This makes it possible to control the temperature of the ring-shaped waveguide to a more uniform temperature. Thus, the tunable dispersion compensator 201 of this embodiment uses a directional coupler for the optical coupler and uses no Mach Zender interferometer unlike the conventional tunable dispersion compensator 101 shown in FIG. 1. Furthermore, the respective ring resonators have basically the same shape, same size and same specification. Therefore, they do not have mutually different specifications as in the case of the conventional tunable dispersion compensator 111 shown in FIG. 3. Thus, the tunable dispersion compensator 201 of this embodiment has quite a simple structure.

Here, an example of design parameters will be described. The core diameter ranges from 0.1 to 10 μm, for example, approximately 5 μm. The length of the circumference of the ring-shaped waveguide ranges from 1 to 16 mm, for example, approximately 2 to 3 mm. The coupling efficiency of the directional coupler is several tens of percent, for example, approximately 50%. The FSR (free spectral range) of the resonator ranges from 12.5 to 200 GHz, for example, approximately 100 GHz. Furthermore, the temperature coefficient of the resonating central wavelength is approximately 0.01 nm/° C.

The substrates of these waveguides are made of silicon or glass (silica glass, etc.). Furthermore, these waveguides are formed by depositing silica glass on the substrates. The refractive index of the core is adjusted by Ge, etc., to be added to the silica glass. The heater is formed of a thin-film heater and evaporated or fixed onto the ring-shaped waveguide. The thin-film heater is preferably made of metal and Cr, Pt, TiN, etc., is used.

Then, optical characteristics of the tunable dispersion compensator of the first embodiment of the present invention will be explained.

Figure 5:
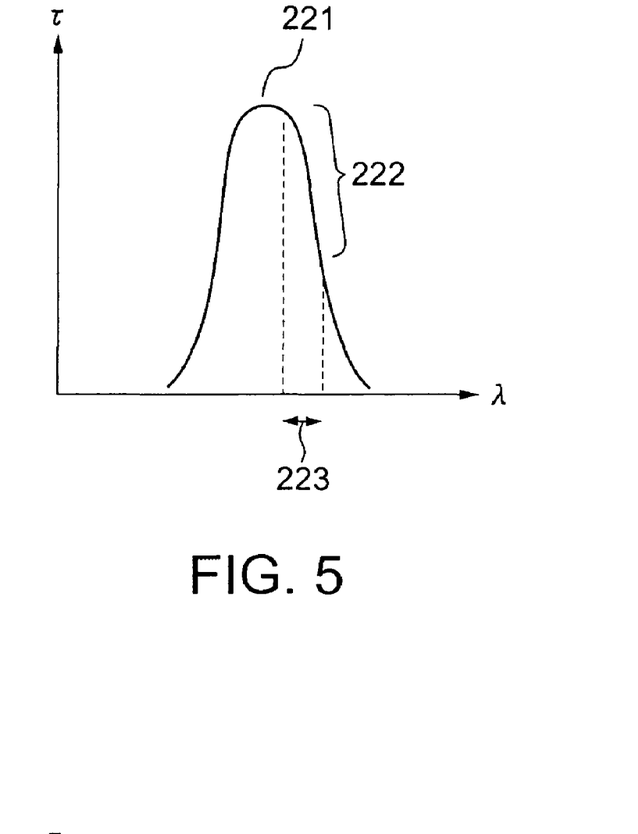
FIG. 5 is a delay time spectrum of a ring resonator according to the first, embodiment of the present invention.

FIG. 5 shows a delay time spectrum of the first ring resonator $202_1$. In this figure, the vertical axis represents a delay time τ of an optical signal and the horizontal axis represents a wavelength λ. A delay time spectrum 221 of the first ring resonator $202_1$ has a waveform similar to a Gaussian distribution. The first ring resonator $202_1$ is provided with only one heater $205_1$ as shown in FIG. 4. By controlling the temperature of this heater $205_1$, the central wavelength of the delay time spectrum is shifted to the long wavelength side or short wavelength side. As described above, the first to nth ring resonators $202_1$ to $202_n$ have basically the same phase. Therefore, the waveforms of the first to nth ring resonators $202_1$ to $202_n$ have basically the same shape. Thus, the tunable dispersion compensator 201 of this embodiment combines a plurality of waveforms of the same shape by changing their central wavelengths and thereby creates a combined waveform that matches the dispersion compensation characteristic of the optical fiber.

Then, the principle of operation of the tunable dispersion compensator of the first embodiment of the present invention will be explained.

Figure 6:
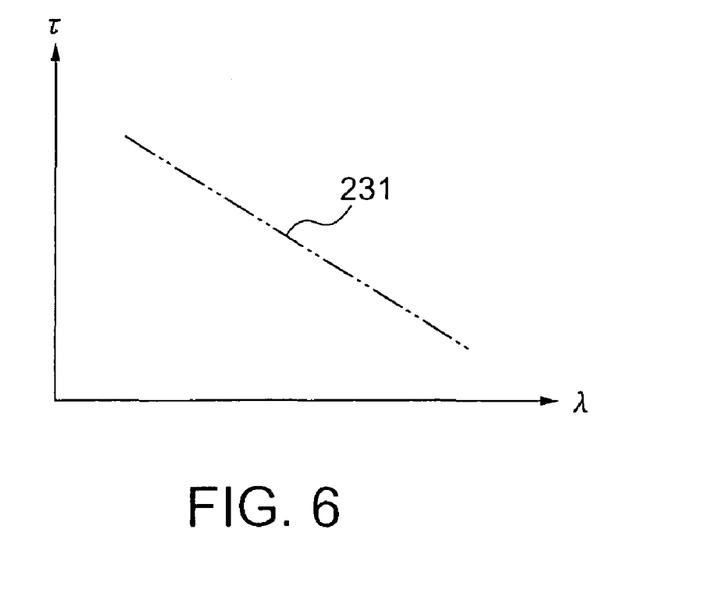
FIG. 6 is a delay time spectrum of the entire tunable dispersion compensator according to the first embodiment of the present invention.

The concept of obtaining a combined waveform that matches the dispersion compensation characteristic of the optical fiber will be explained using FIG. 6 to FIG. 11. A rightward declining line 231 shown in FIG. 6 is an ideal characteristic for compensating the chromatic dispersion characteristic 121 of the optical fiber in FIG. 2. On the other hand, a slope 222 at the top right of the delay time spectrum 221 shown in FIG. 5 is steeper than the line 231. For this reason, this slope 222 at the top right for dispersion compensation is too steep to be practical. Furthermore, it has a very narrow wavelength range 223 whose dispersion can be compensated. That is, it is difficult to approximate to the line 231 necessary for dispersion compensation of the optical fiber using one delay time spectrum 221.

Figure 7:
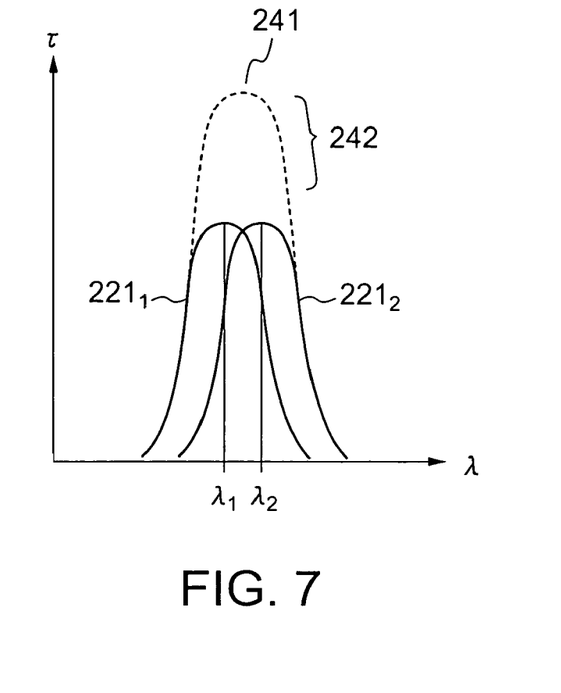
FIG. 7 is a combined waveform obtained by shifting and combining central wavelengths of two delay time spectra.

Thus, FIG. 7 shows a case of combining two waveforms $221_1$ and $221_2$ of the same shape as that of the delay time spectrum shown in FIG. 5 by slightly changing their central wavelengths. The combined waveform is shown as a two-wave combined waveform 241. By way of example, suppose the number of stages n of the tunable dispersion compensator 201 shown in FIG. 4 is "2" and the first and second ring resonators $202_1$ and $202_2$ are used to constitute the tunable dispersion compensator. When a temperature difference is given between the first and second heaters $205_1$ and $205_2$, a difference in central wavelengths of the delay time spectrum is produced and the first and second delay time spectra $221_1$ and $221_2$ are obtained. A two-wave combined waveform 241 obtained by combining the delay time spectrum of the first ring resonator $202_1$ having a central wavelength $\lambda_1$ and the delay time spectrum of the second ring resonator $202_2$ having a central wavelength $\lambda_2$ has a flat area near the apex. Furthermore, the height of the two-wave combined waveform 241 is approximately twice the height of delay time spectra $221_1$ and $221_2$ before the combination. However, the inclination of the slope 242 at the top right remains substantially unchanged.

Figure 8:
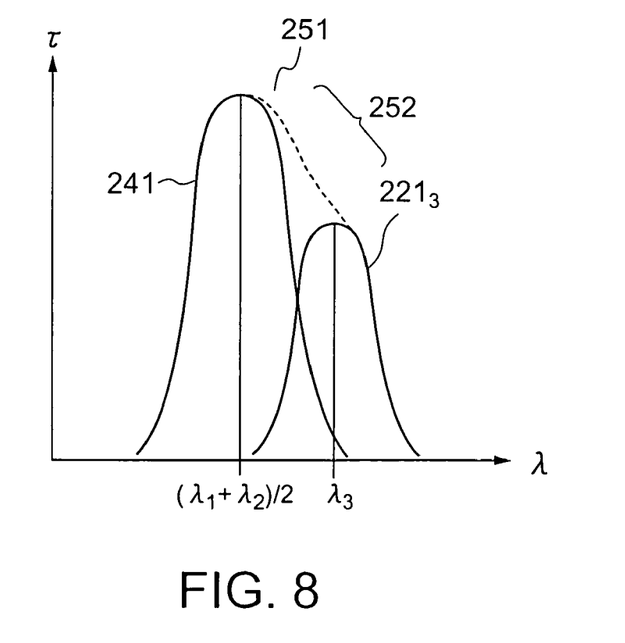
FIG. 8 is a combined waveform with a gentler slope at the top right of the combined waveform shown in FIG. 7.

Here, a first trial to reduce the inclination at the top right of the two-wave combined waveform is shown in FIG. 8.

The number of stages n of the tunable dispersion compensator 201 is increased to "3" and a third delay time spectrum $221_3$ is combined with the two-wave combined waveform 241. A central wavelength $\lambda_3$ of the third delay time spectrum $221_3$ is determined so as to overlap with the right side of the two-wave combined waveform 241 as shown in FIG. 7. Combining the third delay time spectrum $221_3$ reduces the inclination of the slope 252 at the top right of the two-wave combined waveform 241. Note that when the central wavelength $\lambda_3$ of the third delay time spectrum $221_3$ is too close to the central wavelength "$(\lambda_1+\lambda_2)/2$" of the two-wave combined waveform 241, it is not possible to reduce the inclination of the slope 252 at the top right.

Thus, by controlling these central wavelengths $\lambda_1$ to $\lambda_3$ using the first to third delay time spectra $221_1$ to $221_3$ of the same shape, it is possible to combine, for example, a three-wave combined waveform 251 as shown by a dotted line of FIG. 8. Using the inclination of the slope at the right shoulder of this combined waveform 251, it is possible to compensate for dispersion of the optical fiber.

Figure 9:
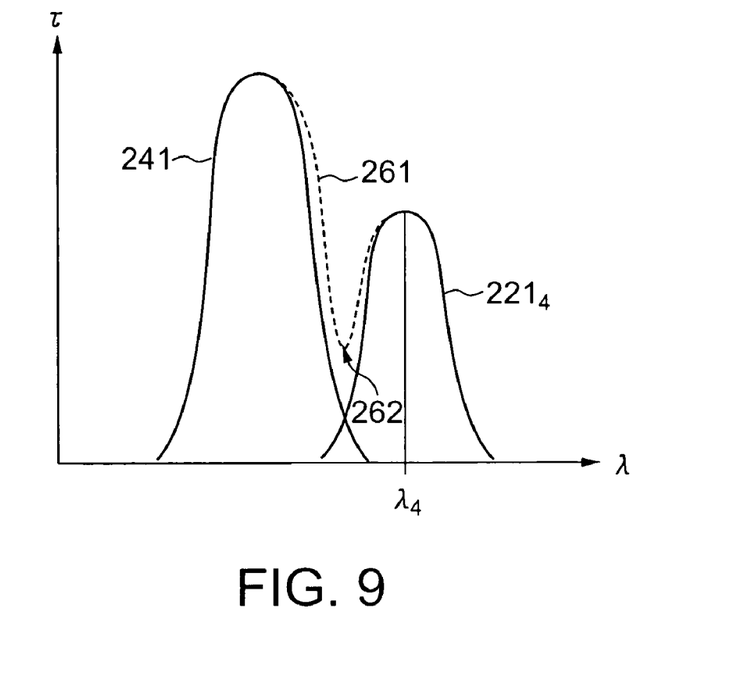
FIG. 9 is a combined waveform obtained by locating the delay time spectrum to be combined away from the combined waveform shown in FIG. 7 to the long wavelength side.

FIG. 9 shows the case where a delay time spectrum $221_4$ to be newly combined with the two-wave combined waveform 241 shown in FIG. 7 is placed closer to the long wavelength side than FIG. 8. The central wavelength $\lambda_4$ of the fourth delay time spectrum $221_4$ is set closer to the long wavelength side than the central wavelength $\lambda_3$ of the third delay time spectrum $221_3$ shown in FIG. 8. Thus, when the delay time spectrum to be combined thirdly is set on the long wavelength side, the combined waveform 261 combining these three waveforms has a dent 262 in the central part.

Therefore, to make up for this dent 262, a fourth delay time spectrum is combined.

Figure 10:
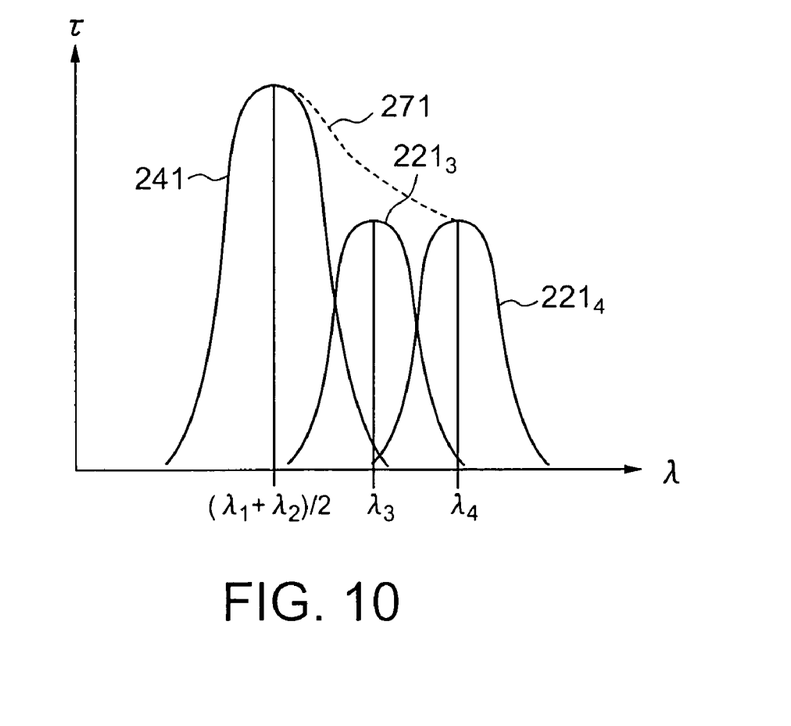
FIG. 10 is a combined waveform with a delay time spectrum inserted so as to complement the dent of the combined waveform shown in FIG. 9.

FIG. 10 shows a third delay time spectrum $221_3$ to be the fourth waveform inserted so as to make up for the dent 262 of the combined waveform 261 shown in FIG. 9. The four-wave combined waveform 271 has a gentle slope within a range from the central wavelength "$(\lambda_1+\lambda_2)/2$" of the two-wave combined waveform 241 to the central wavelength $\lambda_4$ of the fourth delay time spectrum $221_4$.

Figure 11:
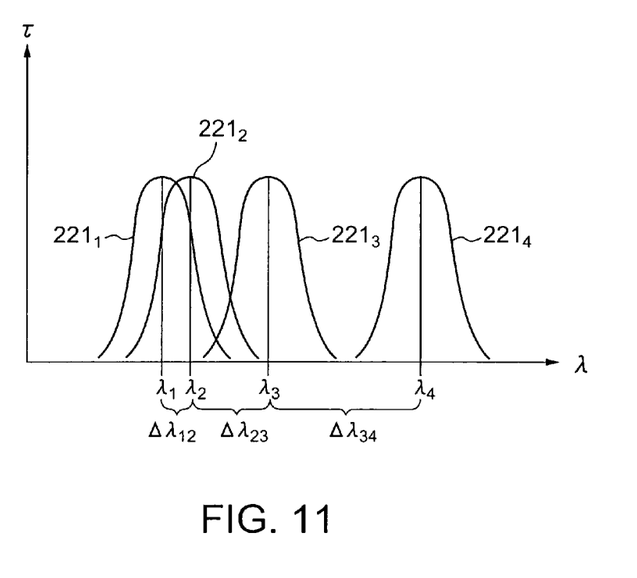
FIG. 11 shows the respective delay time spectra of the first to fourth waveforms shown in FIG. 10.

FIG. 11 shows the individual waveforms of the first to fourth delay time spectra shown in FIG. 10. In the first to fourth delay time spectra $221_1$ to $221_4$ having basically the same shape, if the wavelength differences among central wavelengths $\lambda_1$ to $\lambda_4$ are assumed to be $\Delta\lambda_{12}$, $\Delta\lambda_{23}$ and $\Delta\lambda_{34}$, these have a relationship shown in the following Expression (1).

$$\Delta\lambda_{12} \leq \Delta\lambda_{23} \leq \Delta\lambda_{34} \qquad (1)$$

Based on all that has been described above, the following conclusion can be drawn. It is possible to create a waveform usable to compensate for dispersion of an optical fiber by setting central wavelengths $\lambda_1$ to $\lambda_4$ using the first to fourth delay time spectra $221_1$ to $221_4$ of the same shape. The four-wave combined waveform 271 in FIG. 10 has a gentler slope than the three-wave combined waveform 251 in FIG. 8 and is therefore more practical.

To carry out dispersion compensation of an optical fiber using the three-wave combined waveform 251 shown in FIG. 8 and the four-wave combined waveform 271 shown in FIG. 10, it is necessary to set a dispersion characteristic which cancels out the dispersion characteristic of the optical fiber. When the three-wave combined waveform 251 shown in FIG. 8 is used, two other central wavelengths $\lambda_2$, $\lambda_3$ are fine-tuned with respect to the central wavelength $\lambda_1$. However, when a desired dispersion characteristic is not obtained, the other three central wavelengths $\lambda_2$, $\lambda_3$, $\lambda_4$ are fine-tuned with respect to the central wavelength $\lambda_1$ using the four-wave combined waveform 271 shown in FIG. 10.

Here, an example of a technique for simplifying the tuning will be explained. In FIG. 11, the first to third delay time spectra $222_1$ to $221_3$ are densely distributed within a relatively narrow wavelength range compared to the fourth delay time spectrum $221_4$. Therefore, these central wavelengths are set first. Then, the remaining fourth delay time spectrum $221_4$ may also be tuned with respect to this three-wave combined waveform. Or it is also possible to set a two-wave combined waveform of the first and second waveforms and the central wavelength of the fourth delay time spectrum $221_4$ first and then tune the remaining third delay time spectrum $221_3$.

As shown in FIG. 11, intervals at which the central wavelengths of these delay time spectra are arranged increase as the wavelength becomes longer with respect to the central wavelength $\lambda_1$ of the delay time spectrum $221_1$. By increasing this interval exponentially or as a function of nth degree (n: integer of 2 or greater), it is possible to make the slope at the top right of the combined waveform a flatter line with fewer dents. This makes it possible to approximate the combined waveform to the ideal straight line shown in FIG. 6.

Here, up to the four-wave combined waveform has been explained so far, but it is possible to form a gentler and flatter inclination by increasing the number of waveforms. In this case, disposing the distribution of central wavelengths exponentially or as a function of nth degree (n: integer of 2 or greater) facilitates the setting.

Then, the structure of the control system of the tunable dispersion compensator of the first embodiment of the present invention will be explained.

Figure 12:
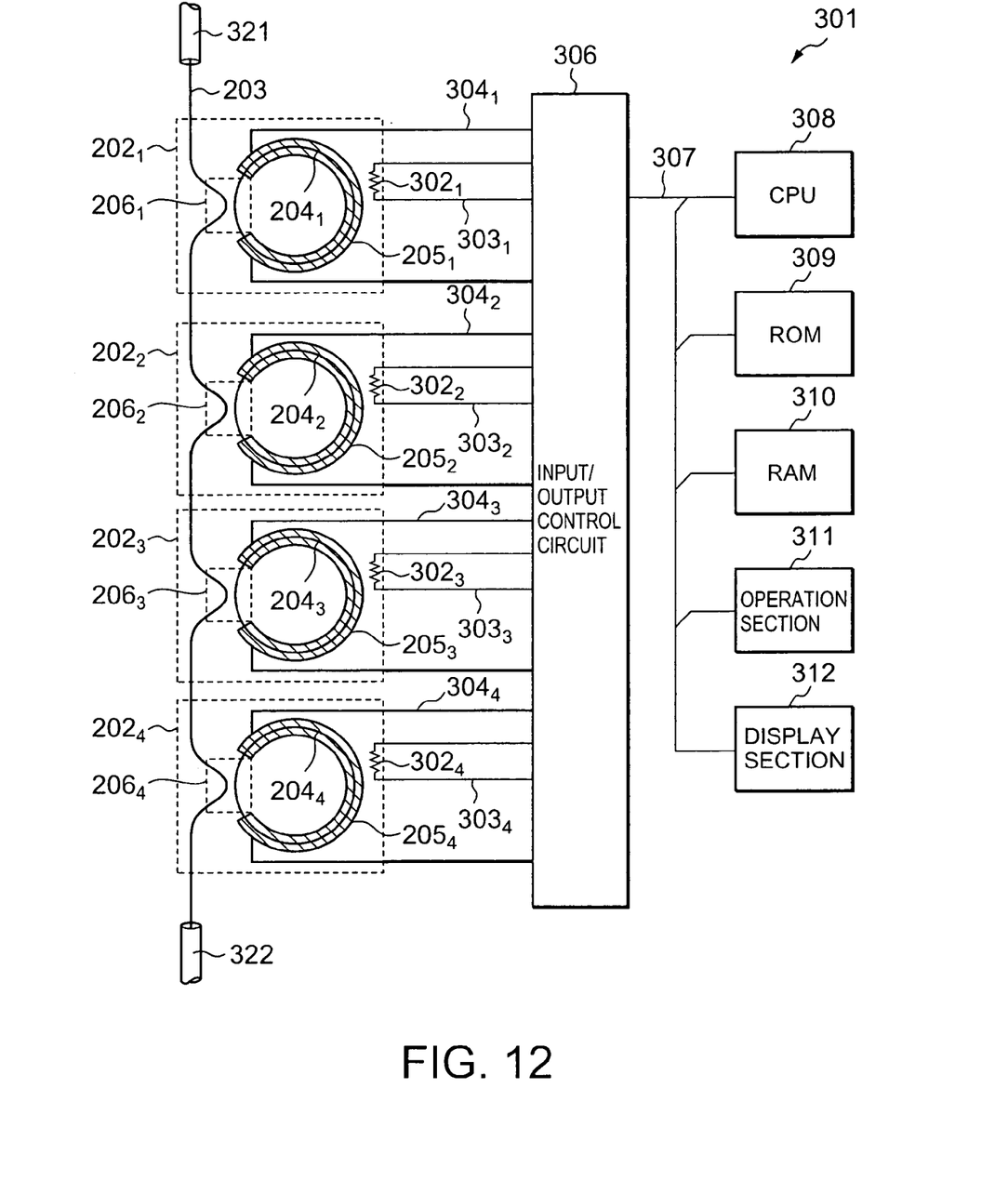
FIG. 12 is a schematic block diagram including a control system in the first embodiment of the present invention.

FIG. 12 shows the structure of the tunable dispersion compensator including the control system, too. In this FIG. 12, the same components as those in FIG. 4 are assigned the same reference numerals and explanations thereof will be omitted as appropriate. The drawings used in the aforementioned explanations will also be used as appropriate.

A tunable dispersion compensator 301 provides first to fourth ring resonators $202_1$ to $202_4$ provided with temperature detection elements $302_1$ to $302_4$. The first to fourth ring resonators $202_1$ to $202_4$ are manufactured using patterns in basically the same size and the same shape and these characteristics are basically the same. Temperature detection signal lines (two each) $303_1$ to $303_4$ of the temperature detection elements $302_1$ to $302_4$ and power supply lines (two each) $304_1$ to $304_4$ of the heaters $205_1$ to $205_4$ are connected to an input/output control circuit 306. This input/output control circuit 306 is connected to a CPU (central processing unit) 308, a ROM (read only memory) 309, a RAM (random access memory) 301, an operation section 311 and a display section 312, etc., through a bus 307 such as a data bus. One end of an optical fiber 321 whose chromatic dispersion is to be compensated is connected to one end of the linear waveguide 203. Furthermore, one end of the optical fiber 322 through which an optical signal whose chromatic dispersion has been compensated is transmitted is connected to the other end of the linear waveguide 203.

The temperature detection elements $302_1$ to $302_4$ are thermistors or platinum resistors, etc. The temperature detection signal lines $303_1$ to $303_4$ and power supply lines $304_1$ to $304_4$ are wiring patterns or lead wires, etc., evaporated onto waveguide substrates. The CPU 308 controls various sections of the tunable dispersion compensator 301. The ROM 309 is a read only memory storing control data, which are conditions, etc., for controlling the amount of dispersion compensation. The control data includes a control program for controlling the CPU 308, layout and sequence of central wavelengths of delay time spectra of the respective ring resonators, change as to whether central wavelengths of the respective ring resonators are fixed or made variable. The RAM 310 is a random access memory for temporarily storing various data temporarily required to control the CPU 308. The operation section 311 is the section that inputs an instruction for dispersion compensation to an optical signal input from the optical fiber 321. The display section 312 is a display for displaying data and the compensation results of characteristics input to the operation section 311. For example, the display section 312 is constructed of a liquid crystal display, etc.

Then, the operation of the control system of the tunable dispersion compensator of the first embodiment of the present invention will be explained.

Figure 13:
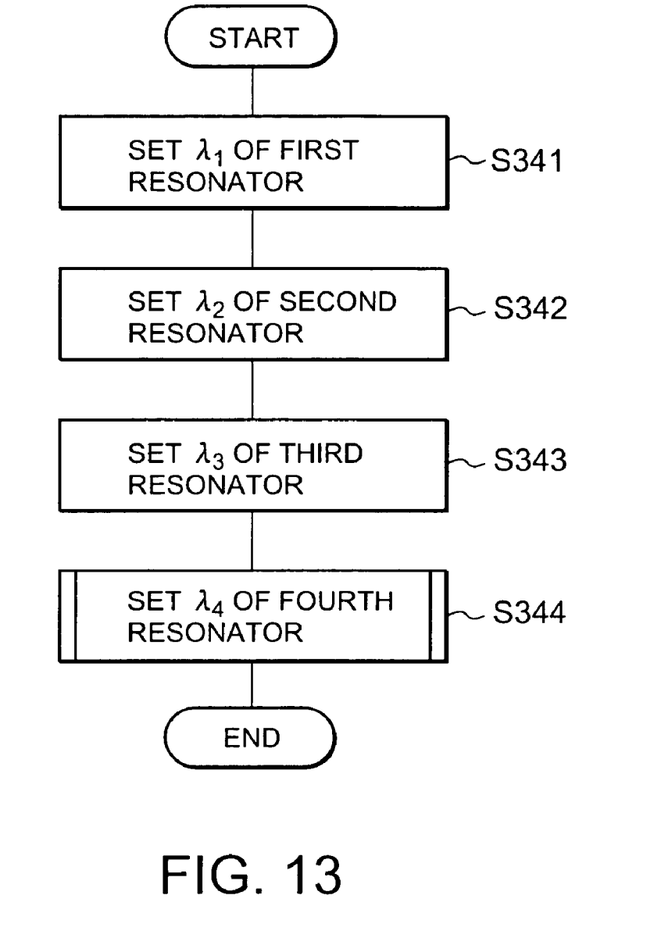
FIG. 13 is a flow chart showing an overview of an initial setting of dispersion compensation by the tunable dispersion compensator according to the first embodiment of the present invention.

FIG. 13 shows an overview of an initial setting of dispersion compensation using the tunable dispersion compensator of this embodiment. An initial setting is required when the tunable dispersion compensator 301 shown in FIG. 12 is newly connected to the optical fiber 321 or when the structure of the optical fiber 321 is different. Now, an example thereof will be shown. The first to third delay time spectra $221_1$ to $221_3$ shown in FIG. 11 are subjected to experiments beforehand and fixed to three central wavelengths $\lambda_1$, $\lambda_2$ and $\lambda_3$. Then, by only changing the central wavelength $\lambda_4$ of the fourth delay time spectrum $221_4$, the inclination characteristic of dispersion compensation adaptable to the optical fiber 321 is created. First, the first delay time spectrum $221_1$ by the first ring resonator $202_1$ is fixed to the central wavelength $\lambda_1$ shown in FIG. 11 (step S341) The central wavelength $\lambda_1$ is set by the CPU 308 controlling the power supplied to the heater $205_1$ while detecting an ambient temperature of the first ring resonator $202_1$ using the temperature detection element $302_1$. Then, the second and third delay time spectra $221_2$ and $221_3$ are likewise fixed to central wavelengths $\lambda_2$ and $\lambda_3$ predetermined by experiments. The second delay time spectrum $221_2$ is set to the central wavelength $\lambda_2$ (step S342) and the third delay time spectrum $221_3$ is set to the central wavelength $\lambda_3$ (step S343). Finally, the central wavelength $\lambda_4$ of the fourth delay time spectrum $221_4$ is set (step S344). This final adjustment is controlled so as to cancel out the actual chromatic dispersion characteristic of the optical fiber 321. In this example, central wavelengths of delay time spectra are set in order of wavelengths.

Figure 14:
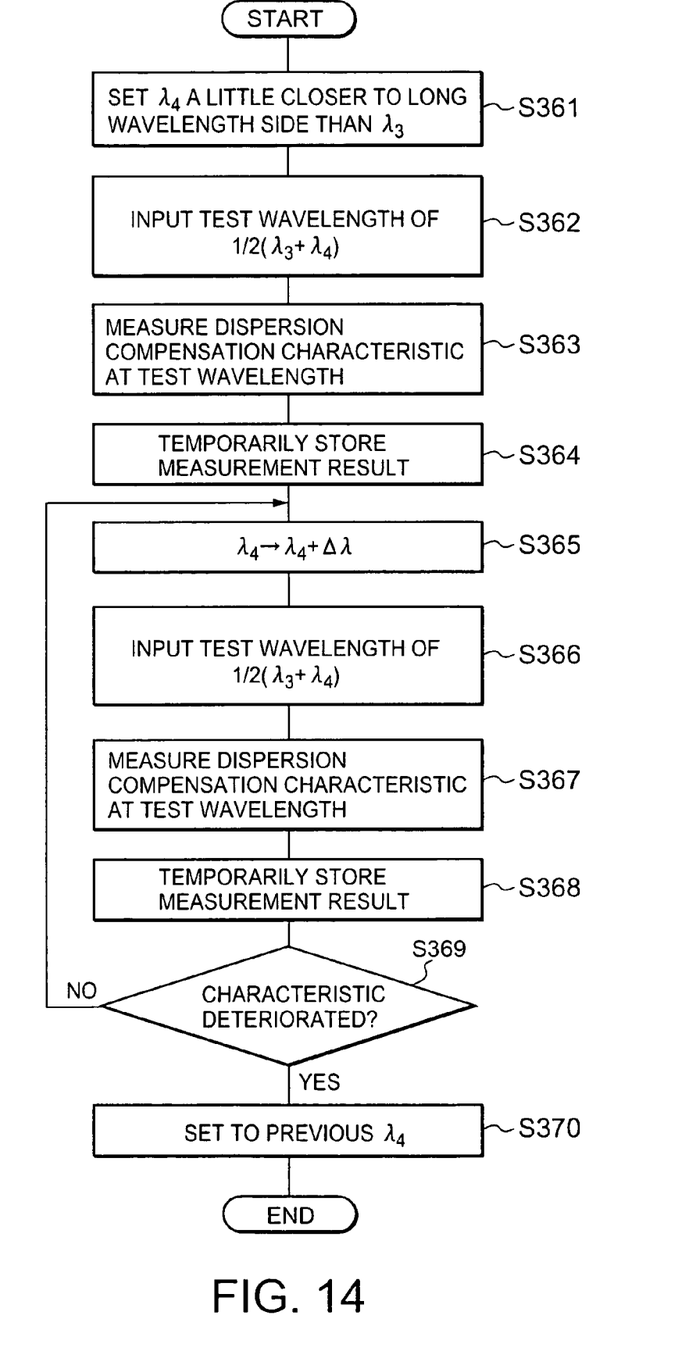
FIG. 14 is a flow chart showing the control of central wavelength of the fourth delay time spectrum according to the first embodiment of the present invention.

FIG. 14 shows details of the control flow in a subroutine (S344 in FIG. 13) of the step of setting the central wavelength $\lambda_4$ of the fourth delay time spectrum. First, the central wavelength $\lambda_4$ of the fourth delay time spectrum $221_4$ is set to a value a little closer to the long wavelength side than the central wavelength $\lambda_3$ (step S361). Then, a test wavelength corresponding to an average value $(\lambda_3+\lambda_4)/2$ of the wavelength which is the sum of the central wavelengths $\lambda_3$ and $\lambda_4$ is input from the optical fiber 321 to be compensated (step S362). At this time, wavelengths to be other references are also input together with the test wavelength. Then, the characteristic of the test wavelength after dispersion compensation is measured (step S363). The measurement result together with the central wavelength $\lambda_4$ at that time is temporarily stored in the RAM 310 (step S364). Then, the central wavelength $\lambda_4$ is incremented by a predetermined micro wavelength $\Delta\lambda$ (step S365). Then, the test wavelength corresponding to the average value $(\lambda_3+\lambda_4)/2$ of the wavelength which is the sum of the central wavelengths $\lambda_3$ and $\lambda_4$ is input from the optical fiber 321 to be compensated (step S366). Wavelengths to be other references are input together with the test wavelength at this time, too. Then, the characteristic of the test wavelength after dispersion compensation is measured (step S367). The measurement result together with the central wavelength $\lambda_4$ at that time is temporarily stored in the RAM 310 (step S368). In this stage, the CPU 308 compares the characteristic after dispersion compensation measured this time with the previously measured characteristic. Then, it is decided whether the movement of the central wavelength $\lambda_4$ to the long wavelength side has deteriorated the characteristic after dispersion compensation or not (step S369). The deterioration of the characteristic after dispersion compensation here refers to the fact that the inclination of the dispersion compensation characteristic of the optical signal which is dispersion-compensated and output is greater than before or that dents occur in the dispersion compensation characteristic or that the dents grow. If the characteristic has not been deteriorated (N), the process returns to step S365 where the central wavelength $\lambda_4$ is incremented by a predetermined micro wavelength $\Delta\lambda$. In this way, while the characteristic after dispersion compensation is being improved, the central wavelength $\lambda_4$ of the fourth delay time spectrum $221_4$ moves gradually to the long wavelength side. At some point in time when the result of the decision in step S369 shows that the characteristic has deteriorated (Y), the fourth delay time spectrum $221_4$ is set to the previous central wavelength $\lambda_4$ stored in the RAM 310 (step S370). Then, the processing is finished (end). Of course, even after it is decided in step S369 that the characteristic has deteriorated, it is also possible to carry out processing of increasing the central wavelength $\lambda_4$ a predetermined number of times to determine an optimum value for the central wavelength $\lambda_4$ in a comprehensive manner. Furthermore, the central wavelength $\lambda_4$ may be regarded as an optimum value when the characteristic does not change from the previous characteristic.

It is also possible to determine the central wavelength $\lambda_1$ and central wavelength $\lambda_4$ so that the wavelength band to be dispersion-compensated is covered first, then control the central wavelength $\lambda_2$ and central wavelength $\lambda_3$ and control the dispersion curve in the intermediate part. Furthermore, it is also possible to move the central wavelength of each ring resonator so that the central wavelength of the delay time spectrum for each ring resonator becomes gradually exponentially coarser from the short wavelength side to the long wavelength side and then fine-tune the central wavelengths of the individual ring resonators. In the same way, it is also possible to move the central wavelength of each ring resonator so that the central wavelength of the delay time spectrum for each ring resonator becomes gradually coarser as a function of nth degree (n: integer of 2 or greater) from the short wavelength side to the long wavelength side and then fine-tune the central wavelength.

Figure 15:
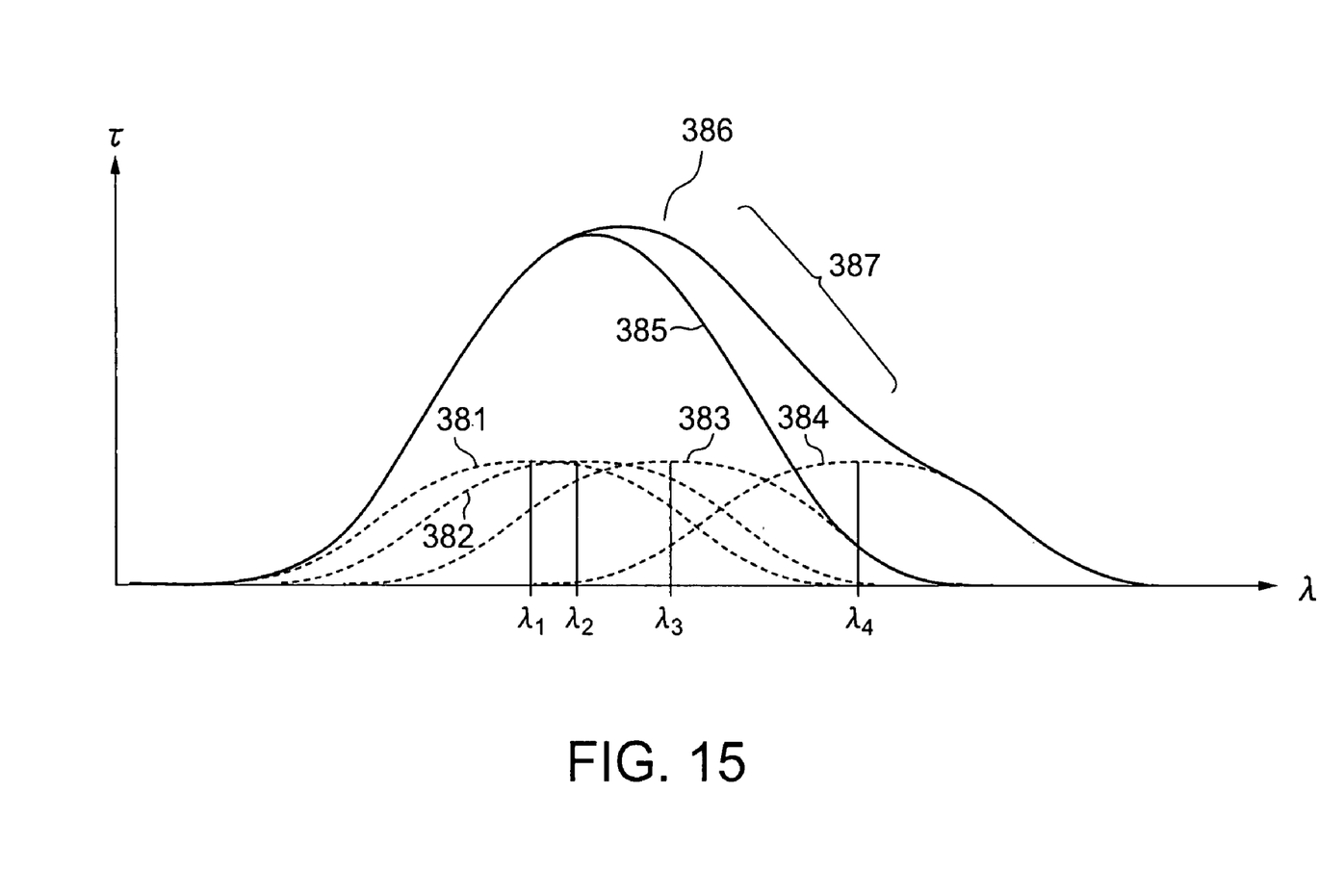
FIG. 15 shows the four delay time spectra according to the first embodiment of the present invention and a delay time spectrum showing an example of a waveform combining them.

Based on all that has been described above, FIG. 15 shows four waveforms according to this embodiment and an example of a waveform combining these waveforms. A first curve 381 indicates the first delay time spectrum of the shortest central wavelength $\lambda_1$, a second curve 382 indicates the second delay time spectrum of the central wavelength $\lambda_2$. Likewise, a third curve 383 indicates the third delay time spectrum of the central wavelength $\lambda_3$ and a fourth curve 384 indicates the fourth delay time spectrum of the longest central wavelength $\lambda_4$. A fifth curve 385 combines the first to third curves 381 to 383 and a sixth curve 386 combines the fifth curve 385 and fourth curve 384. Using a slope 387 at the top right of the sixth curve 386 can obtain a gentle slope over a wider wavelength band than a single delay time spectrum. Using this slope compensates chromatic dispersion of an optical signal received through the optical fiber.

Figure 16:
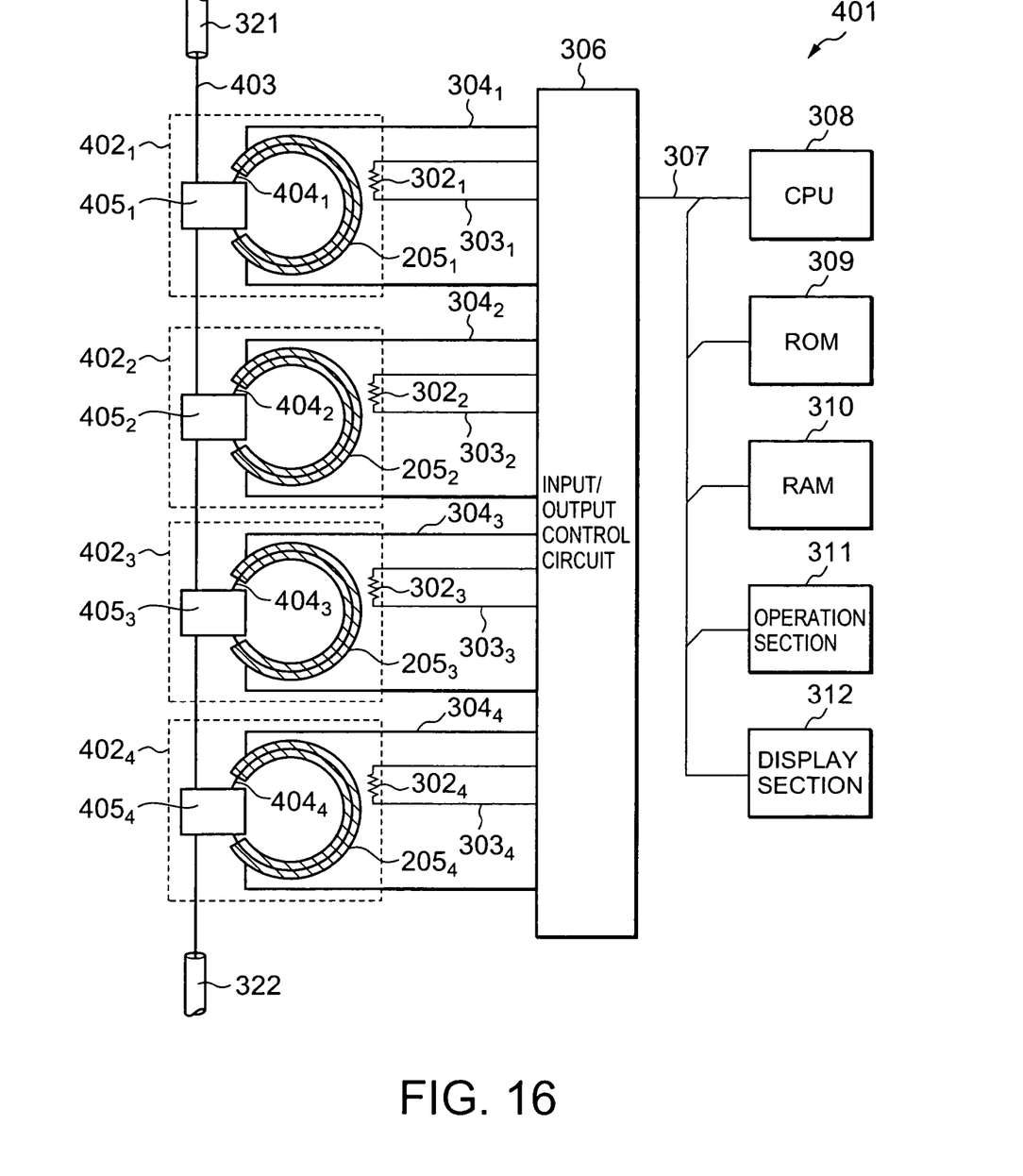
FIG. 16 is a schematic block diagram including a control system of a tunable dispersion compensator according to a second embodiment of the present invention.

In the first embodiment, a directional coupler is used as the optical coupler, which couples optical signals, but it is also possible to use another device or a coupler that distributes an optical signal between one waveguide and a ring-shaped waveguide. As an example thereof, FIG. 16 shows a second embodiment. FIG. 16 shows a tunable dispersion compensator in the case where a multi-mode interference (MMI) waveguide coupler is used instead of the directional coupler in FIG. 12 as an optical coupler. In this second embodiment, the same components as those in the first embodiment in FIG. 12 are assigned the same reference numerals. This second embodiment is the same as the first embodiment except that a linear waveguide 403 and respective ring-shaped waveguides $404_1$ to $404_4$ are optically coupled using the multi-mode interference waveguide couplers $405_1$ to $405_4$ instead of the directional couplers. Furthermore, the optical characteristic and operation of the tunable dispersion compensator of this second embodiment are also the same as those of the first embodiment.

In the first and second embodiments described above, the tunable dispersion compensator is constructed of four stages of ring resonators. However, the tunable dispersion compensator may also be constructed of three stages of ring resonators or five or more stages of ring resonators depending on the chromatic dispersion of the optical fiber and characteristics of the respective ring resonators. A configuration of five or more stages of ring resonators can obtain a wider wavelength range or a dispersion compensation characteristic with fewer ripples.

Furthermore, in the foregoing embodiments, the ring resonators making up the tunable dispersion compensator have basically the same size and basically the same shape, but some of them may also have different sizes or shapes. In this way, it is possible to obtain an equivalent dispersion compensation characteristic with fewer stages. Or it is possible to obtain a dispersion compensation characteristic with the same number of stages with a wider range or fewer ripples.

The foregoing embodiments use heaters for heating and control to thereby control central wavelengths of delay time spectra of the respective ring resonators, but it is also possible to use a Peltier device, etc., to control heating or cooling.

Furthermore, the foregoing embodiments control central wavelengths of delay time spectra of the respective ring resonators through temperature control, but it is also possible to control central wavelengths of delay time spectra through an electric field using optical waveguides of ferroelectrics such as lithium niobate.

As described above, the present invention has the following effects:

The tunable dispersion compensator of the present invention controls central wavelengths of the respective ring resonators using one type of heater. Therefore, the tunable dispersion compensator can reduce the number of heaters and the circuit for controlling the heaters to half compared to the conventional structure shown in FIG. 1. This reduces the number of parts and number of locations to be controlled and can improve the reliability of the tunable dispersion compensator. This also leads to a cost reduction.

Furthermore, the tunable dispersion compensator of the present invention adopts basically the same configuration for the respective ring resonators, and therefore it is possible to design, manufacture, control or inspect the respective ring resonators uniformly and more easily. This can reduce the costs involved therein. Moreover, a control circuit of the same specification can also be used for control and the control can be performed through the same operation, which facilitates control. This can also reduce the cost involved therein.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A tunable dispersion compensator comprising:
    a plurality of ring resonators connected in series having the same delay time spectrum; and
    a central wavelength controlling unit which controls the respective central wavelengths at which said plurality of ring resonators are resonating,
    wherein each of said plurality of ring resonators includes a linear waveguide, a ring-shaped waveguide disposed along said linear waveguide, and an optical coupler which optically couples said linear waveguide and said ring-shaped waveguide, thereby constituting a plurality of ring-shaped waveguides and a plurality of optical couplers, wherein the plurality of said ring-shaped waveguides have same shape and size, and wherein the plurality of said optical couplers have the same coupling efficiency, wherein said respective central wavelengths are controlled to respective predetermined values by said central wavelength controlling unit and the respective delay time spectra of said resonators are combined, and the inclination of the slope of the combined delay time spectrum is thereby controlled and the amount of dispersion compensation is changed according to the degree of the inclination of said slope, and wherein respective intervals between said central wavelengths increase as the wavelengths become longer.

2. The tunable dispersion compensator according to claim 1, wherein said optical couplers are directional couplers.

3. The tunable dispersion compensator according to claim 1, wherein said optical couplers are multi-mode interference (MMI).

4. The tunable dispersion compensator according to claim 1, wherein an interval of said neighboring central wavelengths increases exponentially.

5. The tunable dispersion compensator according to claim 1, wherein an interval of said neighboring central wavelengths increases as a function of nth degree (n: integer of 2 or greater).

6. The tunable dispersion compensator according to claim 1, wherein said linear waveguide, said ring-shaped waveguides and said optical couplers provided for said ring resonators are formed of silica glass optical waveguides.

7. The tunable dispersion compensator according to claim 6, wherein said central wavelength controlling means is temperature controlling means.

8. The tunable dispersion compensator according to claim 7, wherein said temperature controlling means covers the whole area of said ring-shaped waveguide except the portions constituting said optical couplers.

9. The tunable dispersion compensator according to claim 7, wherein said temperature controlling means is a heater.

10. The tunable dispersion compensator according to claim 9, wherein said heater is a thin-film heater.

11. The tunable dispersion compensator according to claim 10, wherein said thin-film heater is formed with metal evaporated thereon.

12. The tunable dispersion compensator according to claim 1, wherein said linear waveguide, said ring-shaped waveguides and said optical couplers provided for said ring resonators are formed of ferroelectric optical waveguides.

13. The tunable dispersion compensator according to claim 12, wherein said central wavelength controlling means is electric field application controlling means.

14. The tunable dispersion compensator according to claim 1, wherein said plurality of resonators are constructed of at least three stages.

15. The tunable dispersion compensator according to claim 1, further comprising a power supply line for supplying power to said central wavelength controlling means.

16. The tunable dispersion compensator according to claim 1, further comprising central wavelength detecting means for detecting central wavelengths of said respective resonators.

17. The tunable dispersion compensator according to claim 6, further comprising central wavelength detecting means for detecting central wavelengths of said ring resonators, wherein said central wavelength detecting means is temperature detecting means for detecting temperatures of said ring resonators.

18. The tunable dispersion compensator according to claim 17, wherein said temperature detecting means is a thermistor.

19. The tunable dispersion compensator according to claim 17, wherein said temperature detecting means is a platinum resistor.

20. The tunable dispersion compensator according to claim 17, further comprising a temperature detection signal line for transmitting temperature information detected by said temperature detecting means.

21. The tunable dispersion compensator according to claim 1, further comprising controlling means for controlling said central wavelength controlling means.

22. The tunable dispersion compensator according to claim 21, further comprising a CPU which controls said controlling means.

23. The tunable dispersion compensator according to claim 1, further comprising an input optical fiber and an output optical fiber.

24. A tunable dispersion compensation method comprising the steps of:

controlling resonating central wavelengths of a plurality of resonators connected in series having a same time delay spectrum;

combining the respective delay time spectra of said resonators;

controlling an inclination of a slope of the combined delay time spectrum; and changing an amount of dispersion compensation, wherein the respective delay time spectra of said resonators have the same shape, the central wavelengths of each of said resonators are set to different wavelengths, and an interval of said neighboring central wavelengths increases as the wavelength becomes longer.

25. The tunable dispersion compensation method according to claim 24, wherein an interval of said neighboring central wavelengths increases exponentially.

26. The tunable dispersion compensation method according to claim 24, wherein an interval of said neighboring central wavelengths increases as a function of nth degree (n: integer of 2 or greater) on the wavelength axis.

27. The tunable dispersion compensation method according to claim 24, wherein said central wavelengths are controlled according to temperature.

28. The tunable dispersion compensation method according to claim 24, wherein said central wavelengths are controlled by applying an electric field thereto.

29. The tunable dispersion compensation method according to claim 24, wherein at least three stages of said resonators are provided.

30. The tunable dispersion compensation method according to claim 24, wherein said resonators are controlled in order of wavelengths starting with the one whose resonating central wavelength is set to the lowest level.

31. The tunable dispersion compensation method according to claim 24, wherein said resonators are controlled in order of wavelengths starting with the one whose resonating central wavelength is set to the highest level.

32. The tunable dispersion compensation method according to claim 24, wherein said resonator whose resonating central wavelength is set to the lowest level and said resonator whose resonating central wavelength is set to the highest level are controlled first and followed by resonators whose resonating central wavelength is set therebetween.

33. The tunable dispersion compensation method according to claim 24, further comprising the steps of:
setting the resonating central wavelengths of said resonators slightly closer to the long wavelength side in the control of said central wavelengths;
inputting an optical signal of a first test wavelength and measuring a first dispersion compensation characteristic;
storing the first measurement result;
further setting said central wavelengths slightly closer to the long wavelength side;
inputting an optical signal of a second test wavelength and measuring a second dispersion compensation characteristic;
storing said second measurement result;
comparing said first and said second measurement results to decide whether the measurement result shows deterioration or not; and
returning to the step of further setting said central wavelength slightly closer to the long wavelength side when said second measurement result shows no deterioration or ending the wavelength setting when said second measurement result shows deterioration.

34. The tunable dispersion compensation method according to claim 33, wherein said deterioration means that the inclination of said second dispersion compensation characteristic becomes greater than the inclination of said first dispersion compensation characteristic.

35. The tunable dispersion compensation method according to claim 33, wherein said deterioration means that the dents of said second dispersion compensation characteristic becomes greater than the dents of said first dispersion compensation characteristic.

* * * * *